May 20, 1947. R. F. BURCH, SR 2,420,650
SELF-SHARPENING SHEARS
Filed Dec. 15, 1944
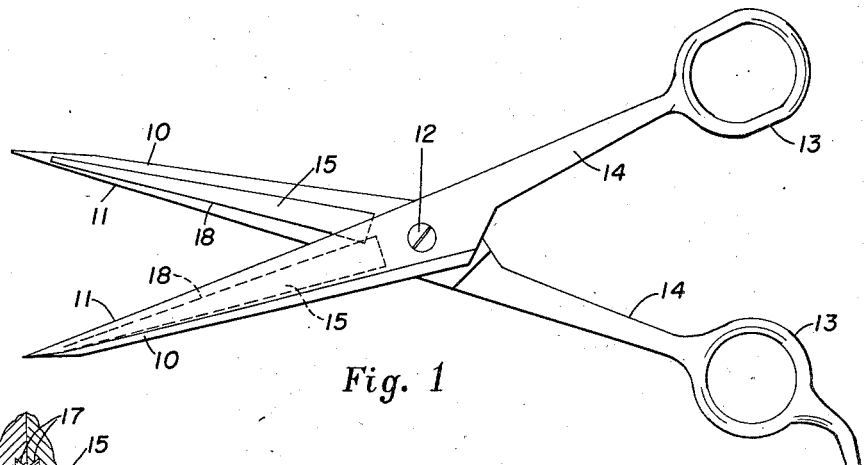
Fig. 1
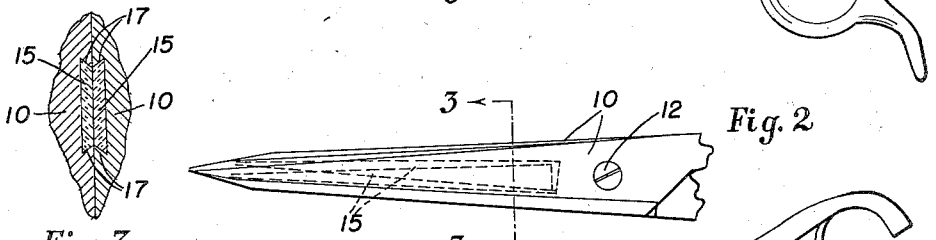
Fig. 3
Fig. 2
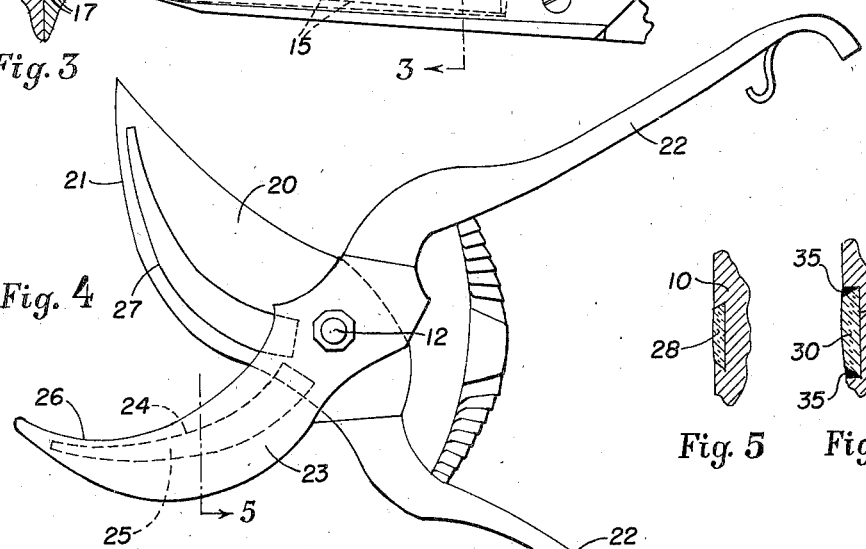
Fig. 4
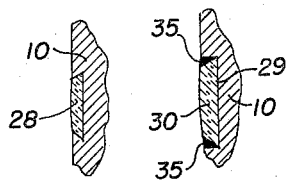
Fig. 5    Fig. 8
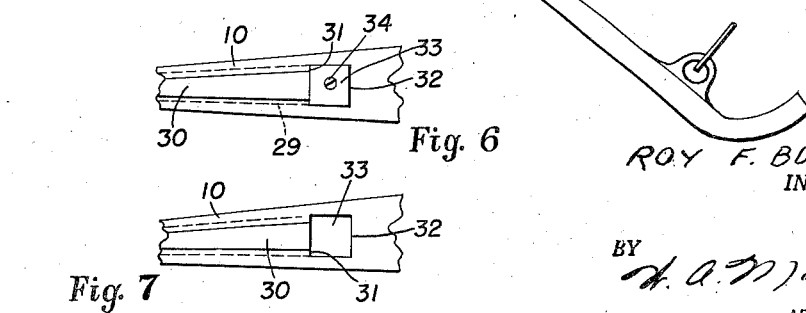
Fig. 6
Fig. 7
ROY F. BURCH SR.
INVENTOR.
BY H. A. McGrew
ATTORNEY Patented May 20, 1947

2,420,650

UNITED STATES PATENT OFFICE 2,420,650

SELF-SHARPENING SHEARS

Roy F. Burch, Sr., Denver, Colo.

Application December 15, 1944, Serial No. 568,246

15 Claims. (Cl. 30—138)

This invention relates to cutting instruments, such as scissors, shears and the like, and more particularly to improvements therein whereby they may be made self-sharpening.

Among the objects of this invention are to provide a cutting instrument which normally will have a pair of opposed blades provided with cutting edges movable past each other, constructed so that the cutting edge of one or more of the blades is maintained; to provide such a cutting instrument in which the cutting edges are maintained automatically during use thereof; to provide such a cutting instrument in which the means for maintaining such cutting edges is attached thereto, and in a new and novel manner; to provide such a cutting instrument, such as barbers' or surgeons' scissors, which may be subjected to high temperature in boiling water or steam, as in sterilization, without adversely affecting the self-sharpening properties; to provide improvements in cutting instruments whereby such instruments may be made self-sharpening irrespective of the type, shape or size of the cutting blades; to provide such improvements which may be carried out in a number of different ways, to accommodate different types of cutting instruments; and to provide such improvements in cutting instruments which will be highly efficient in operation and require little or no attention during use.

Other objects of this invention and novel features thereof will become apparent from the following description, taken in connection with the accompanying drawing, in which:

Fig. 1 is a plan view of a pair of scissors, embodying this invention, in open position;

Fig. 2 is a plan view of the scissors in closed position;

Fig. 3 is an enlarged section taken along line 3—3 of Fig. 2;

Fig. 4 is a plan view of a pair of pruning shears, also embodying this invention, in open position;

Fig. 5 is a section similar to Fig. 3, illustrating an alternative construction;

Fig. 6 is a fragmentary view of a scissors' blade or the like, illustrating one manner of securing an abrasive element to the blade;

Fig. 7 is a similar fragmentary view, illustrating a different manner of securing an abrasive element to the blade; and Fig. 8 is also a similar fragmentary view illustrating a still different manner of attaching an abrasive element to the blade.

The improvement provided by this invention may be embodied in a cutting instrument, such as a pair of shears or the like, including a pair of opposed blades having cutting edges movable past each other, by providing one or both blades with a recess therein, and disposing abrasive material in the recess in position to contact the opposite blade to maintain a cutting edge thereon. As the opposite blade passes over the abrasive material during use of the scissors, the sharpness of the cutting edge will be maintained by the slight grinding or honing action of the abrasive material. Due to the frequent movements of the opposite blade across the cutting element, it is unnecessary for any substantial pressure to be exerted against the abrasive by the blade, so that very little metal is removed—only enough to maintain the cutting edge during normal use. Of course, the more sustained the use, the more times the blade will pass over the abrasive, so that the sharpening action is directly proportional to the amount of use. For this reason, the scissors or other cutting instrument constructed in accordance with this invention are self-sharpening, thus maintaining a high efficiency in cutting action, and also requiring no attention from the user.

A pair of scissors embodying this invention may comprise, as in Figs. 1 to 3, a pair of blades 10 having cutting edges 11 movable past each other, the blades being rotatable about a pivot or pin 12 and adapted to be actuated by finger grips 13 formed at the rear end of handle extensions 14. Each blade is provided with abrasive material, such as an abrasive element 15, disposed in a longitudinal recess 16 in each blade. As is evident from Fig. 3, the inner surface of each blade will pass over the abrasive material, each time the scissors are closed in a cutting action.

Each recess 16 may taper longitudinally, as in Figs. 1 and 2, and be provided with undercut walls, so that the abrasive material will, as in Fig. 3, engage the undercut walls to provide a locking joint 17, which prevents the abrasive from dropping out of the recess. An edge 18 of each recess, closer to the cutting edge 11, may be substantially parallel thereto, or make a slight angle therewith, as in Fig. 1, depending upon the configuration of the blade and/or the sharpening action desired.

As in Figs. 4 and 5, a suitably shaped recess may be formed in a blade 20 having a curved cutting edge 21, as in a pair of pruning shears, the blades 20 and 23 of which are pivotal about a pin 12 and operated by a pair of handles 22. The closer edge 24 of an abrasive element 25 disposed in blade 23 may be parallel in shape to the cutting edge 21 of blade 20, as shown, and spaced from cutting edge 26 of blade 23. Also, blade 20 may be provided with abrasive material 27, similarly to blade 23. The action of the abrasive material in the case of pruning shears is substantially the same as in the case of scissors, as it will be observed that each time the shears are closed, the blades pass over the abrasive element secured to the opposite blade, thereby maintaining a sharp cutting edge on each blade.

The abrasive element may be formed of suitable material, such as silicon carbide or "carborundum," crystallized alumina or "corundum," or boron carbide or "noride." Preferably, the abrasive material is produced by mixing powdered Carborundum of a suitable fineness, with a heat-resistant cement, and pouring the liquid mixture into the recess. After setting, the abrasive element produced is locked securely in position by the undercut walls of the recess, which also permit the abrasive mixture to be poured more accurately and conveniently. The recess preferably is formed in the blade during forming of the blade, as in the mold during casting of the blade, in case the blade is formed of cast steel or other cast material. However, the recess may be formed in any other suitable manner, as by machining.

The abrasive material preferably extends slightly above the surface of the blade, and the extending section may be rounded, as in the case of abrasive element 28 of Fig. 5, to minimize the possibility of the cutting edge hitting an edge of the abrasive element and to permit ready clearance of material being cut.

Instead of forming the abrasive element in the blade, it may be formed separately and removably or relatively permanently secured in the recess. The element may be made separately in any suitable manner, as by fusion or molding. Such an element may be secured in the recess in a number of different ways, in accordance with this invention, such as those illustrated in Figs. 6 to 8. As in Fig. 6, the undercut walls of the recess 30 may extend longitudinally to a point corresponding to the end of an abrasive element 31 when in final position, such as to a shoulder 32. The wider portion of the recess, between shoulder 31 and end 32, may be provided with straight sides and be adapted to permit the wider end of the abrasive element to be dropped into the recess, and then moved longitudinally until the sloping edges of the abrasive element contact the undercut walls of the recess. After the abrasive element is in position, an insert 33 is placed in the wider portion of the recess to retain the abrasive element in the recess by preventing longitudinal movement thereof. The insert may be secured in the recess by a mechanical fastening such as screw 34 of Fig. 6, which extends through the insert to engage a threaded hole in blade 10. Or, the insert may be secured by deposited metal, as in Fig. 7. In such case, the insert may be brazed or welded in place, and, if desired, the edge of the insert may be sloped outwardly to provide for reception of the deposited metal.

Instead of providing the recess with undercut walls, the walls may be straight and the abrasive element secured directly therein, without the necessity of using an insert, as in Fig. 8. In such a case, the edges of the abrasive element may be sloped, as before, to provide a space for deposition of metal 35 comprising suitable brazing, welding or soldering material which will adhere to the metal of blade 10. Since the abrasive element will normally be formed of a refractory, as well as abrasive material, it will normally be too difficult to weld or braze the abrasive element directly to the blade, although in the case of certain materials it may be possible to form a sufficiently strong bond for the purpose.

Particularly in the case of scissors or similar cutting instruments used by barbers or doctors which must be sterilized for sanitary or other reasons, it is desirable to provide a construction which may be dipped into boiling water or subjected to steam or other sterilizing fluid, without any tendency for the abrasive element to loosen. The all-metal constructions, hereinbefore described are suitable for this purpose. However, in the case of pruning shears and the like, suitable bonding materials for holding the abrasive element in the recess may be found in the plastic or cementitious materials.

Where continual use, day after day, is to be expected, as in the case of barbers' scissors, a readily replaceable element as in the construction illustrated in Fig. 6, has certain advantages which will be obvious. It will be understood, however, that any other suitable manner of securing the abrasive element to the blade of a cutting instrument may be utilized.

It will be further understood that the improvement of this invention is applicable to pinking scissors, thinning shears and other types of cutting instruments in which one of the blades is serrated or provided with a discontinuous cutting edge or a cutting edge which is curved in one or more directions. It will also be understood that additional changes may be made, both in the construction and application, without departing from the spirit and scope of this invention.

What is claimed is:

1. A cutting instrument, comprising a pair of opposed blades each movable with respect to a predetermined point of said instrument and having cutting edges movable past each other, at least one blade having a recess therein; and abrasive material in said recess for contacting the opposite blade to maintain a cutting edge thereon.

2. A cutting instrument, comprising a pair of opposed blades having cutting edges movable past each other, each blade having a recess therein; and abrasive material in each recess for contacting the opposite blade to maintain a cutting edge thereon.

3. A cutting instrument, comprising a pair of opposed blades having cutting edges movable past each other, at least one blade having a recess therein; a pivot about which said blades rotate; and abrasive material in said recess for contacting the opposite blade to maintain a cutting edge thereon.

4. A cutting instrument, comprising a pair of opposed blades having cutting edges movable past each other, each blade having a recess the closer edge of which is substantially parallel to said cutting edge; and abrasive material in each recess for contacting the opposite blade to maintain a cutting edge thereon.

5. A cutting instrument, comprising a pair of opposed blades having cutting edges movable past each other, at least one blade having a curved cutting edge and the opposite blade having a recess the closer edge of which is curved to correspond to the curvature of said curved cutting edge; and abrasive material in said recess for contacting the opposite blade to maintain a cutting edge thereon.

6. In a cutting instrument having a pair of opposed blades provided with cutting edges movable past each other, the improvement which comprises an abrasive element secured in and corresponding in shape to a recess formed in at least one of said blades and having undercut walls, said element having sloping edges fitting beneath said undercut walls and being positioned to contact the opposite blade to maintain a cutting edge thereon.

7. In a cutting instrument having a pair of opposed blades provided with cutting edges movable past each other, the improvement which comprises an abrasive element secured in and corresponding in shape to a recess formed in at least one of said blades, said element extending above the surface of said blade and being positioned to contact the opposite blade to maintain a cutting edge thereon.

8. In a cutting instrument having a pair of opposed blades provided with cutting edges movable past each other, the improvement which comprises an abrasive element secured in and corresponding in shape to a recess formed in at least one of said blades, said element having a rounded exposed surface and being positioned to contact the opposite blade to maintain a cutting edge thereon.

9. In a cutting instrument having a pair of opposed metal blades provided with cutting edges movable past each other, the improvement which comprises an abrasive element corresponding in shape to a recess formed in at least one of said blades, said element having sloping edges and being positioned to contact the opposite blade and maintain a cutting edge thereon, and said element being secured in said recess by metal deposited above said sloping edges.

10. A cutting instrument comprising a pair of opposed blades having cutting edges movable past each other, at least one blade having a longitudinally tapering recess; an abrasive element corresponding in shape to said recess for contacting the opposite blade to maintain a cutting edge thereon; and an insert secured in the wider end of said recess to retain said abrasive element therein.

11. A cutting instrument comprising a pair of opposed blades having cutting edges movable past each other, each blade having a longitudinally tapering recess the closer edge of which is substantially parallel to said cutting edge; an abrasive element corresponding in shape to said recess for contacting the opposite blade to maintain a cutting edge thereon; and an insert secured in the wider end of each recess to retain said abrasive element therein.

12. A cutting instrument comprising a pair of opposed blades having cutting edges movable past each other, at least one blade having a longitudinally tapering recess provided with undercut walls for a greater portion of its length, to a point near the wider end thereof; an abrasive element having sloping edges and corresponding in shape to said recess for contacting the opposite blade to maintain a cutting edge thereon, said abrasive element being adapted to be placed in said recess with the wider end thereof at the wider end of said recess and then moved into a position in which the sloping edges thereof engage the undercut walls of said recess; and an insert secured in the wider end of said recess to retain said abrasive element therein.

13. A cutting instrument as defined in claim 12, wherein said insert is secured by a mechanical fastening.

14. A cutting instrument as defined in claim 12, wherein said insert is secured by deposited material.

15. A cutting instrument comprising a pair of opposed blades having cutting edges movable past each other, each blade being provided with abrasive material for contacting the opposite blade to maintain a cutting edge thereon.

ROY F. BURCH, Sr.

REFERENCES CITED

The following references are of record in the file of this patent:

UNITED STATES PATENTS

| Number | Name | Date |
|---|---|---|
| 1,228,642 | Bland | June 5, 1917 |